United States Patent [19]
Allen, Jr.

[11] 3,959,924
[45] June 1, 1976

[54] AUTOMATIC SPOT SPRAYER

[76] Inventor: John Clarence Allen, Jr., Box 87, Indianola, Miss. 38751

[22] Filed: Oct. 24, 1974

[21] Appl. No.: 517,405

[52] U.S. Cl. .............................. 47/1.43; 47/1.7; 172/6
[51] Int. Cl.² .................. A01B 41/00; A01G 13/00
[58] Field of Search .................. 47/1.7, 1.43; 172/6

[56] References Cited
UNITED STATES PATENTS

| | | | |
|---|---|---|---|
| 1,611,774 | 12/1926 | Peel | 47/1.7 |
| 2,484,069 | 10/1949 | Boncompain | 172/6 |
| 3,016,653 | 1/1962 | Gardner | 47/1.7 |
| 3,584,787 | 6/1971 | Thomason | 47/1.7 X |
| 3,683,547 | 8/1972 | Harden | 47/1.7 |
| 3,701,218 | 10/1972 | Priest | 47/1.43 |
| 3,776,316 | 12/1973 | Eberhart | 172/6 |
| 3,866,397 | 2/1975 | Koziol | 47/1.43 X |
| R26,166 | 3/1967 | Inhofer | 47/1.7 |

*Primary Examiner*—Stephen C. Pellegrino
*Attorney, Agent, or Firm*—Darby & Darby

[57] ABSTRACT

Apparatus for treating plants, such as weeds with an herbicide, which plants have grown to at least a predetermined height, including a sensor comprising an adjustable, electrically conductive probe arm adapted to contact such plants coupled to electrical circuitry for generating an electrical signal when such contact is made. The electrical signal opens a solenoid actuated valve which allows the treatment material to flow from a pressurized storage tank through conduits to spray nozzles which dispense the treatment material over the plant. The circuitry includes means by which the solenoid actuated valve is maintained open for a predetermined minimum duration to assume adequate treatment of the plants.

1 Claim, 3 Drawing Figures

AUTOMATIC SPOT SPRAYER

BACKGROUND OF THE INVENTION

This invention relates, generally, to agricultural apparatus and, more particularly, to apparatus for treating plants such, for example, as spraying weeds with an herbicide.

A serious problem in raising row crops, i.e., crops grown in row configuration, such as cotton, corn, etc., has been the growth of weeds in the same rows in which the crops are being grown. Whereas undesirable grass or weeds growing between the crop rows may be quickly pulled by a cultivator, weeds in or closely adjacent to the crop rows must be pulled by hand which is a time-consuming process. An example of such a situation is in raising cotton where, typically, a weed commonly known as Johnson grass infests the rows of cotton. The Johnson grass robs the cotton among which it grows of both moisture and room thereby deleteriously affecting its growth. In the past the Johnson grass had to be pulled by hand substantially increasing the time and expense necessary for raising and harvesting the cotton crop itself.

SUMMARY OF THE INVENTION

Accordingly, one object of the present invention is to provide new and improved apparatus for treating plants.

Another object of the present invention is to provide a new and improved apparatus for treating plants, such as weeds, which grow among and higher than a commercial crop.

Still another object of the present invention is to provide spraying apparatus which treats plants with material, such as herbicides, automatically upon the apparatus sensing such plants.

Yet another object of the present invention is to provide automatic spraying apparatus for treating plants which may be mounted on a conventional tractor.

Briefly, these and other objects are attained by providing apparatus adapted to be mounted on a vehicle, such as a tractor, including an electrically conductive probe element adjustably located at a height higher than the growing crop, but lower than the minimum height of the plants which are to be treated. The apparatus may be mounted in a vehicle driven over the crop rows, the probe contacting the plants causing an electrical circuit to generate a signal which actuates a dispensing system which sprays the plant contacted with any desired treatment material, such as an herbicide. The probe may be selectively raised or lowered on the vehicle depending upon the height of the plants to be treated and the commercial crop. The dispensing system continues to dispense the treatment material for a predetermined duration to insure that the plant is adequately treated with the desired material.

DESCRIPTION OF THE DRAWINGS

A more complete appreciation of the invention and many of the attendant advantages thereof will be readily appreciated as the same becomes better understood by reference to the following detailed description when considered in connection with the accompanying drawings, in which.

DETAILED DESCRIPTION OF THE PREFERRED EMBODIMENT

Figure 1:
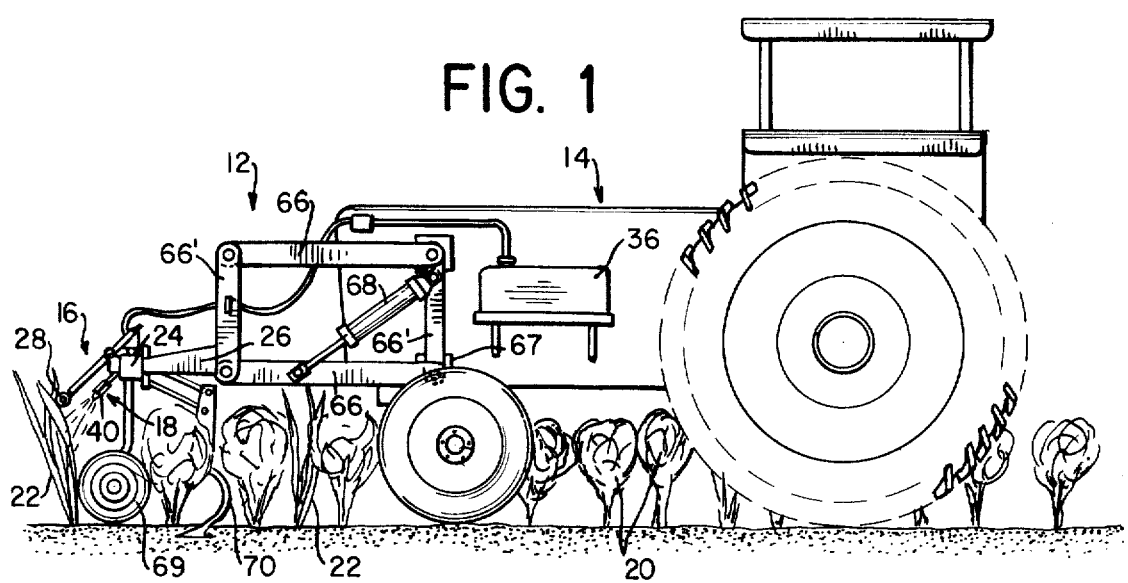
FIG. 1 is a side view of the plant treatment apparatus of the present invention mounted on a tractor.

Referring now to the drawings wherein like reference characters designate identical or corresponding parts throughout the several views, the plant treatment apparatus of the present invention, generally denoted at 10, is mounted on an adjustable frame 12 which itself is connected to a conventional tractor 14. Generally, a typical one of the plant treatment apparatus 10 includes a sensor system 16 and a dispensing system 18, adapted to dispense treatment material over plants located by the sensor system 16 and a dispensing system 18, adapted to dispense treatment material over plants located by the sensor system 16. As shown in FIG. 1, certain commercial crops, such as cotton 20, are grown in rows. Oftentimes, weeds 22, such as Johnson grass grow within or closely adjacent to the row. This invention is directed to treating only those weeds which after a time grow taller than the commercial crop amongst which they are found as shown in FIG. 1 and takes advantage of the fact that all vegetation is electrically conductive to an extent. As will be described in greater detail below, the sensor system 16 senses weeds 22 by contacting them which complete an electrical circuit which generates an electrical signal which actuates the dispensing system 18 which dispenses an herbicide over weeds 22. In this manner weeds 22 are treated in a quick and efficient manner despite the fact that they grow intimately with the commercial crop.

Figure 2:
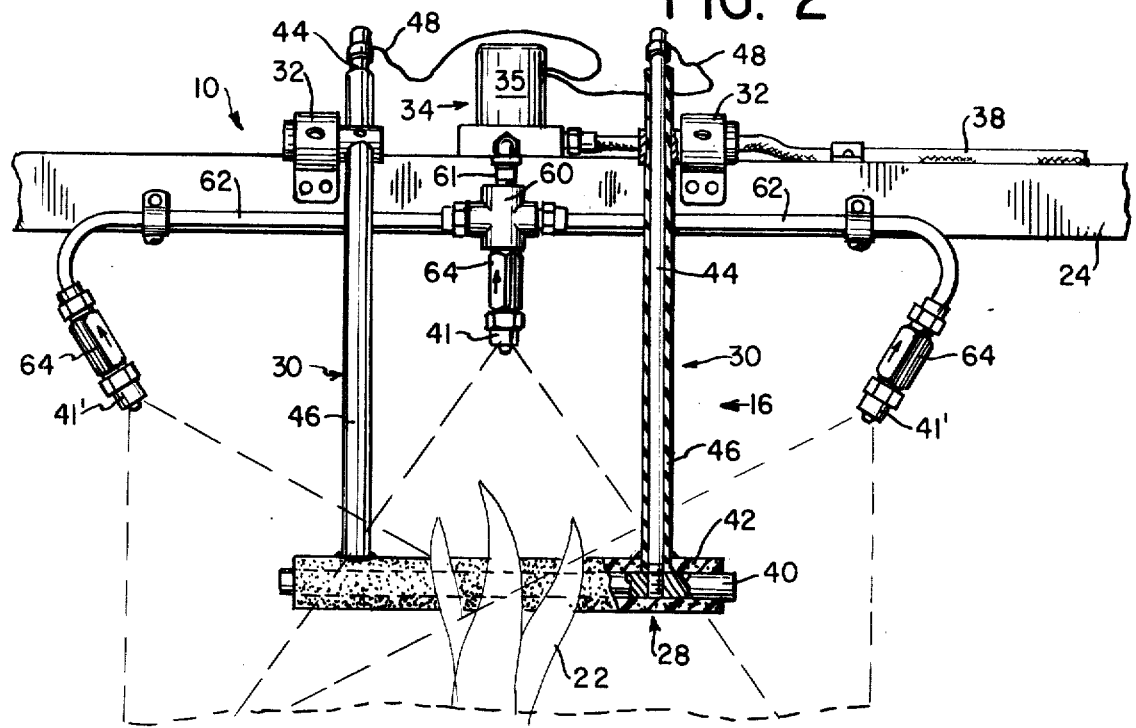
FIG. 2 is a front view of a typical one of the plant treatment apparatus according to the present invention.

Referring now to FIG. 2 which illustrates a typical one of the plant treatment apparatus 10, in conjunction with FIG. 1, an elongate boom 24 is mounted on the adjustable frame 12 via arms 26 adapted to be parallel to the ground. Boom 24 preferably extends across a plurality of crop rows (such as for example as six) and supports a like number of plant-treatment apparatus 10, a typical one of which is shown in FIG. 2. Each such apparatus 10 is mounted directly over a respective crop row so that when tractor 14 is driven in a direction parallel to the rows, each apparatus 10 is driven directly over its corresponding crop row. Referring to FIG. 2, the sensor system 16 comprises a probe arm 28 mounted on the ends of a pair of support arms 30, the other ends of which are fixed to boom 24 as by brackets 32. Essentially, probe arm 28 comprises an electrically conductive terminal of an electrical circuit which circuit is closed when the probe arm 28 contacts a weed 22.

In the illustrated preferred embodiment, probe arm 28 includes a rod 40 which is formed by any suitably rigid, electrically conductive material such as aluminum. A sponge layer 42 is wrapped over rod 40 and is maintained in a state wherein it is saturated with a liquid electrolyte, such as water, during the operation of the invention. This can be accomplished by mounting a container filled with electrolyte, such as a small bottle filled with water, adjacent the probe arm and providing a conduit, such as a hollow needle, between the interior of the container and the sponge. As electrolyte evaporates from the sponge, more electrolyte will be drawn from the container to maintain the sponge in a saturated state. However, it has been found that when the sponge is manually saturated with water, it will remain sufficiently so for about 5 hours (depending upon the humidity, temperature, etc.) so that it is feasible for the operator to manually soak the sponge prior to commencing the operation and completing the plant treatment procedure without having to replenish the electrolyte. The support arms 30 comprise electrically conductive metallic rods 44, which may also be formed of aluminum, whose ends are threaded to the probe rod 40 so that they electrically communicate with it. A sheath 46, formed of an insulative material, such as rubber, is provided over each rod 44 for its full length and a clamp is placed around the hose so that the probe will be insulated from the grounded tractor. Such insulation is necessary in order to prevent the electrically conductive rods 44 from being wet by the plant treatment material which increased the possibility of inadvertent grounding of the probe assembly.

Figure 3:
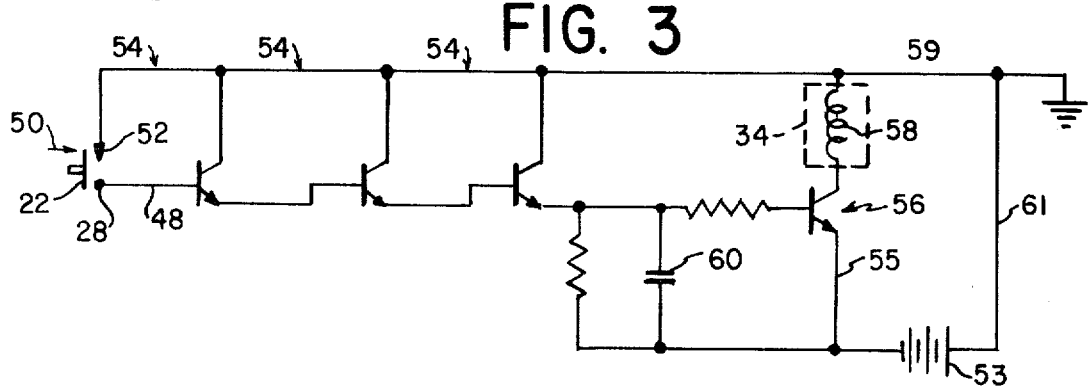
FIG. 3 is a diagram of a preferred electrical circuit for use in the plant treatment apparatus of the present invention.

A conductor 48 is electrically coupled to the upper end of each of the rods 44 and leads into an electrical circuit shown in FIG. 3 which may be contained in the housing 35 of the solenoid actuated valve 34. Referring to FIG. 3, the probe arm, shown as terminal 28', is grounded when it contacts a plant, as represented by a conductor 22' moving in the direction of arrow 50 connecting terminal 28' with ground terminal 52. It is known that all plants are electrically conductive to a degree. For example, Johnson grass has been found to be conductive, having a resistance in the range of 1 to 2 megohms. This causes a voltage drop at terminal 28, which was previously maintained at a predetermined potential by a voltage source 53, which drop is amplified by the cascaded circuits 54 to a level sufficient to saturate transistor 56. A current is then initiated through the circuit defined by source 53, conductor 55, transistor 56, solenoid 58 and conductor 59 and 61. The source is chosen to make the current sufficient to actuate solenoid 58 thereby opening solenoid actuated valve 34 and allowing the treatment material to be dispensed. Additionally, a capacitor 60 is provided whose plates become charged upon transistor 56 becoming saturated. When a plant 22 disengages from probe 28, the capacitor discharges thereby maintaining current through solenoid 58 for a predetermined amount of time even after disengagement. This is advantageous since it is desirable to maintain the solenoid actuated valve 34 open even after contact with the plant is broken in order to assure adequate treatment of the plant. A 25 microfarad capacitor has been used providing 6 to 10 inches of forward travel at the usual tractor speeds after the sensor loses contact with the plant.

Returning now to FIGS. 1 and 2, once the solenoid actuated valve 34 is opened, the treatment material is directed through spray nozzles 41, 41' by dispensing system 15. In the preferred embodiment a tank 36 is fixed to tractor 14, the tank containing the treatment material under pressure. Agriculture sprays are usually stored in such tanks at pressures between thirty to eighty p.s.i. A flexible conduit 38 is connected to the solenoid actuated valve 34, which itself communicates with a four-way fitting 60 via threaded pipe 61. Spray nozzle 41 is positioned beneath fitting 60 adapted to be positioned directly over the plant to be treated. A pair of side mounted spray nozzles 41' are connected to fitting 60 through a pair of rigid conduits 62. The side mounted spray nozzles 41' assure that the plant is treated adequately on the sides as well as from the top. In order to assure substantially instantaneous dispensing of the treatment material upon the probe arm contacting a plant, it is necessary to provide that a minimum of empty space is present in the conducts after valve 34, i.e., in pipe 61, fitting 60 and conduits 62. To accomplish this, conventional check valves 64 are provided at each spray nozzle to prevent the treatment material present in these elements from escaping through the nozzles once solenoid actuated valve 34 closes. Even a small delay between the time at which the probe arm 28 contacts a plant and the initiation of the dispensing of the treatment material caused by the treatment fluid flowing into void areas would result in the plant not being treated with the maximum amount of treatment material. Check valves 64 are conventional and permit fluid to flow through them at, for example, 5 p.s.i. but prevent fluid flow at pressures less than this.

Returning to FIG. 1, the adjustable frame 12 comprises a pair of four member assemblies (one shown), each assembly pivotally mounted as by brackets 67 on one side of tractor 14. Each assembly includes two pairs of opposed members 66,66', each member 66 pivoted to the two members 66' at its ends. Boom 24 is mounted on arms 26 which extends from the leading members 66' and, as will be understood, may extend across a plurality of rows of crop. A hydraulic piston and cylinder assembly 68 has its ends connected to a pair of adjacent, connected members 66, 66' so that upon its actuation by the operator, the boom 24 may be selectively raised or lowered.

As shown in the present embodiment, the plant treatment apparatus 10 is mounted on the front of a tractor 14. At least one wheel assembly 69 whose height is preferably adjustable may extend from the boom 24' to provide additional support. A cultivator 70 may be used in conjunction with the plant treatment apparatus, the ground-working tools of the cultivator being positioned intermediate the plant treatment apparatus so as to be positioned between the rows of the commercial crop. Of course, other mounting configurations are possible for the plant treatment apparatus of the present invention. For example, the apparatus may be mounted on the front of a tractor without any cultivator attachment. Such a version would be preferably utilized late in the growing season on large weeds after the commercial crop has grown too tall for a cultivator. Another possible configuration includes mounting the plant treatment apparatus on a rear mounted cultivator, for example on the spray fenders thereof. Such a configuration would be used from the time of the first cultivation until the crop becomes too large for the use of such a cultivator.

An example of a typical configuration of a plant treatment apparatus 10 for use in treating Johnson grass growing among rows of cotton includes a pair of side nozzles 41' spaced about 20 inches from the central nozzle 41, the cotton being grown in rows separated approximately 40 inches apart. If the weeds can be sprayed from above, the spray nozzles are preferably located above the center to assure good coverage. However, some chemicals are designed to be sprayed on the lower 3 or 4 inches of the weeds. In this case, remote spray nozzles with check valves could be accordingly mounted closer to the ground.

If the plant treatment apparatus is used without a cultivator, unless the tractor is grounded in some other manner, it has been found that the system will operate for only approximately 20 to 30 minutes after which time the tractor builds up a static charge which might inadvertently actuate the solenoid actuated valve. Accordingly, it is suggested that a chain or other flexible conductor be attached at one end to the tractor dragged along the ground, thereby assuring that the tractor is always grounded.

Obviously, numerous modifications and variations of the present invention are possible in light of the above teachings. For example, only one rod 44 may be used to support probe arm 28 and various insulation means may be employed to isolate the probe. Further, an electrically conductive metallic probe may be used in lieu of the rod 40 which is coated with sponge layer 42, despite the reduction in sensitivity inherent in such substitution. In such a case it is desirable that another amplification stage be added to the circuit shown in FIG. 3. More or less than three nozzles may be used with plant treatment apparatus 10. Further, although only one apparatus 10 is shown, it is understood that a plurality of such apparatus may be mounted along the length of boom 24. Additionally, other circuits than the ones shown in FIG. 3 may be used to actuate the dispensing system of the present invention. It is therefore to be understood that within the scope of the appended claims the invention may be practiced otherwise as specifically described herein.

What is claimed is:

1. Apparatus for treating individual plants growing in a row of crops, said plants being at least of a certain predetermined height comprising:
    a frame movable relative to said plants;
    selectively actuatable means mounted on said frame for dispensing treatment material on a plant upon being actuated by an electrical signal and for terminating the dispensing of treatment material upon termination of the signal;
    sensor means mounted on said frame comprising an elongate probe arm disposed substantially parallel to the ground and extending transversely to the direction of intended movement of said frame and located at a height equal to or slightly less than said predetermined height, said probe arm having electrically conductive means disposed along its length, and circuit means for generating said electrical signal for a predetermined time duration substantially instantaneously upon said probe arm contacting one of said plants, said time duration being sufficiently long so as to insure adequate treatment of the contacted plant and also having an upper limit to prevent effective treatment of the crops in the vicinity of the treated plant; and
    a container mounted on said frame fluidly communicating with said dispensing means for storing said treatment material.

2. Plant treatment apparatus as recited in claim 1, further including means for adjusting the height of said probe arm in accordance with the predetermined height of said plants.

3. Plant treatment apparatus as recited in claim 1 wherein said dispensing means includes at least one nozzle fastened to said frame, a conduit fluidly connecting said spray nozzle and said container, a source of pressure being provided to act upon said treatment material in said container tending to urge said material through said conduit and out of said nozzle, and solenoid means for selectively obstructing the flow of said treatment material through said conduit, said solenoid means allowing flow of said material through said conduit upon being actuated by said electrical signal from said sensor means and preventing flow of such material through said conduit upon termination of said electrical signal.

4. Plant treatment apparatus as recited in claim 1 wherein said current conducting means comprises a sponge sheath fixedly disposed over the surface of said arm, and a conductive fluid material retained within said sponge.

5. Plant treatment apparatus as recited in claim 1 wherein said elongate arm is connected to one end of at least one support stem, the other end of said support stem being fixed to said frame, the outer surface of said stem being electrically insulated.

6. Plant treatment apparatus as recited in claim 1 wherein said circuit means includes means for generating a voltage upon said probe arm contacting said plant, means for amplifying said voltage, transistor means on which said amplified voltage is impressed, and a solenoid actuated valve, said circuit means having current flowing therethrough upon the amplified voltage being impressed on said transistor means, said current actuating the solenoid of said solenoid actuated valve and means for maintaining a current for a short time interval after the probe arm disengages the plant.

7. Apparatus as defined in claim 1 wherein said circuit means of said sensor means maintains said electrical signal for a short time interval subsequent to the probe arm disengaging said plant.

* * * * *